(12) United States Patent
Sochtig

(10) Patent No.: US 6,840,757 B2
(45) Date of Patent: Jan. 11, 2005

(54) INJECTION NOZZLE FOR MIXING HEADS OF REACTION CASTING MACHINES

(75) Inventor: Wolfgang Sochtig, Germering (DE)

(73) Assignee: Krauss-Maffei Kunststofftechnik GmbH, München (DE)

(*) Notice: Subject to any disclaimer, the term of this patent is extended or adjusted under 35 U.S.C. 154(b) by 0 days.

(21) Appl. No.: 10/199,885

(22) Filed: Jul. 19, 2002

(65) Prior Publication Data

US 2002/0176907 A1 Nov. 28, 2002

Related U.S. Application Data

(63) Continuation of application No. PCT/EP01/00546, filed on Jan. 18, 2001.

(30) Foreign Application Priority Data

Jan. 20, 2000 (DE) .......................... 100 02 246

(51) Int. Cl.[7] .............................. B29C 45/23
(52) U.S. Cl. ...................... 425/563; 425/564
(58) Field of Search ................. 425/562–566

(56) References Cited

U.S. PATENT DOCUMENTS 4,368,847 A * 1/1983 Ersfeld ....................... 425/566

FOREIGN PATENT DOCUMENTS

DE    32 45 571 A1    6/1984

* cited by examiner

Primary Examiner—Tim Heitbrink
(74) Attorney, Agent, or Firm—Henry M. Feiereisen; Ursula B. Day

(57) ABSTRACT

An injection nozzle for mixing heads of reaction molding machines is disclosed which comprises a housing in which a adjustment assembly is provided for slidably moving between two adjustable stops, wherein the adjustment assembly is configured as a control sleeve which includes a pressure chamber with a movable control piston disposed therein and the pressure chamber can be impinged upon by a pressure medium, for example hydraulic fluid and wherein a first stop is provided for the control sleeve and a second stop is provided for the control plunger thereby permitting an adjustment of two operating points that are exactly reproducible, so as to prevent disturbances during operation of the molding process.

5 Claims, 1 Drawing Sheet

INJECTION NOZZLE FOR MIXING HEADS OF REACTION CASTING MACHINES

CROSS-REFERENCES TO RELATED APPLICATIONS

This application claims the priority of German Patent Application Serial No. 100 02 246.4, filed Jan. 20, 2000 pursuant to 35 U.S.C. 119(a)–(d), the subject matter of which is incorporated herein by reference.

This application is a continuation of prior filed copending PCT International application no. PCT/EP001/00546, filed Jan. 18, 2001.

BACKGROUND OF THE INVENTION

The present invention relates to an injection nozzle and in particular to an injection nozzle for mixing heads of reaction molding machines, wherein a nozzle needle is adjustable for precise operation of the injection nozzle.

When producing form parts according to the reaction injection molding method, two or more liquid, reactive compounds are mixed together whereby a chemical reaction is initiated resulting in a plastic material, which hardens into a form part while in a form tool.

Frequently used in the production of polyurethane-form parts are the compounds polyol and isocyanate. Production of such form parts may be carried out by means of high pressure-injection mixtures, where the compounds are preferably injected by means of injection nozzles that are preferably directed towards each other into the so-called mixing chamber where they mix together as a result of the kinetic energy, but also through the turbulences that are created within the small mixing space. Various mixing heads are known in the prior art (Johannaber, Plastic Machinery Guide, 3. Edition, 1992 pp. 567–571). These mixing heads all have in common the use of injection nozzles for supplying the compounds into the mixing chamber.

When adjusting the nozzle pressure, respectively the injection pressure, it is known in the prior art to adjust the position of the nozzle needle and the resulting nozzle gap, by means of a spring element. By means of the spring, an adjustable force can be imparted onto the nozzle needle when the spring is pre-tensioned, which thereby counteracts the pressure of the compounds that are supplied via this injection nozzle.

In some cases, it is necessary or desirable during production of form pieces by the injection molding technique, to adjust the metering amount of one or both reaction compounds from one form piece to another form piece, or perhaps even to make an adjustment during the production of one form piece. For example, when producing first a small form piece with small discharge capacity and subsequently a distinctly larger form piece, it is desirable, to produce the larger form piece with a larger discharge capacity, which requires corresponding enlargement of the nozzle gap. For a reduced discharge capacity, the nozzle gap is to be reduced correspondingly.

For the afore-described production purpose, an injection nozzle, which is spring loaded is for that purpose disadvantageous, since due to the characteristic behavior of the spring, an exactly reproducible injection pressure cannot be provided when producing varying form pieces. Accordingly, inaccurate injection pressures will have a negative impact on the quality of the form pieces.

A further disadvantage of the injection nozzle for mixing heads of the prior art arises is when the mixing head is opened, the nozzle gap is completely closed at the transition from the re-circulation condition to the mixing condition, which leads to pressure peaks at the compound feed side resulting in vibration in the spring loaded control system. A further disadvantage results, when due to the loss of friction in the spring itself, as well as between housing and the spring, which leads to a relatively large hysteresis in the control behavior. As a result, exact reproducibility of the nozzle pressures cannot be realized, since there is no way the gap sizes at the nozzle gap can be adjusted so they are fixed and reproducible.

From U.S. Pat. No. 4,378,335 a device for a reaction molding process is known, where the injection nozzles for the mixing heads are configured according to type of process used. Accordingly, a adjustment assembly is provided which is combined and unitary with a nozzle needle in the injection nozzle, and which is driven back and forth into different positions for adjustment of the injection gap.

From U.S. Pat. No. 5,443,797, a process and a device for reaction molding is known, in order to produce an improved mixing of the components, wherein the compound mixture, which is flowing into a nozzle area is divided into two streams that in turn stream around a piston and which then combine again at the other side of the separation point.

SUMMARY OF THE INVENTION

It would therefore be desirable and advantageous to provide an improved injection nozzle to obviate prior art shortcomings and to provide for a more reliable setting of the injection nozzle. The present invention resolves prior art problems by providing means for an adjustment of the injection nozzle so that the afore-described shortcomings can be avoided.

According to one aspect of the present invention, an injection nozzle for mixing heads of reaction molding machines is provided, wherein it is possible to set two positions of the nozzle needle, so that corresponding therewith two nozzle gaps can be defined and set in a reproducible manner.

This aspect of the invention is carried out by means of an injection nozzle for mixing heads of reaction molding machines, wherein a adjustment assembly is provided in a housing, and operatively connected with the injection nozzle for slidably moving between two adjustable stops, and wherein a control sleeve is provided as a adjustment assembly having pressure chamber and wherein a control piston is slidably moving within'the pressure chamber, and wherein the pressure chamber can be impinged upon with a pressure medium and wherein a first stop is provided for the control sleeve and a second stop for the control piston.

Further advantageous embodiments and developments are described herein. One of the advantages of the invention lies in disregarding the principle of establishing an equilibrium between the spring force and the pressure of the compounds, in favor of the adjusting two different but distinct nozzle gaps, by providing a adjustment assembly for the injection nozzle adjacent the nozzle needle so that two set but adjustable positions can established. The adjustment assembly can be moved by means of a pressure medium, for example hydraulic oil. This has the advantage, that the adjustment of the nozzle gap from a first nozzle gap to a second nozzle gap can be carried out in the shortest time, so that the discharge capacity from form part to form part or, perhaps even during production of a form part, can be adjusted quickly and reliably while the compound pressure is kept constant. The invention provides an adjustment system comprising a control sleeve and a control piston which slidably moves within the control sleeve, and which, upon impinging pressure are moved relative to each other, so that the control sleeve is slidably moved from a first adjustable position to a second adjustable position. Thus, two nozzle gaps S2 and S1 can be exactly and reproducibly set.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
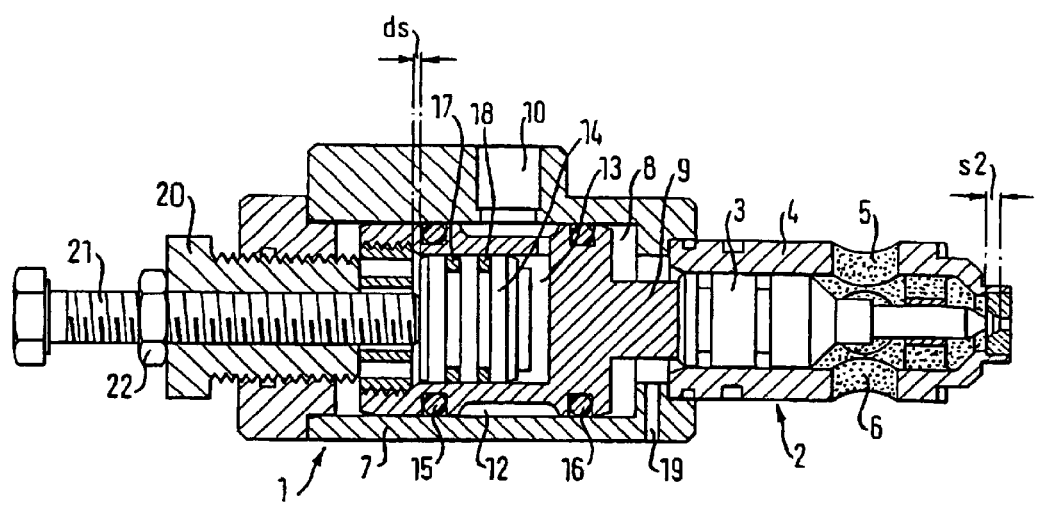
FIG. 1 a first embodiment of the injection nozzle according to the invention with the control sleeve in the rearward position.

Throughout all the Figures, same or corresponding elements are generally indicated by same reference numerals.

Figure 2:
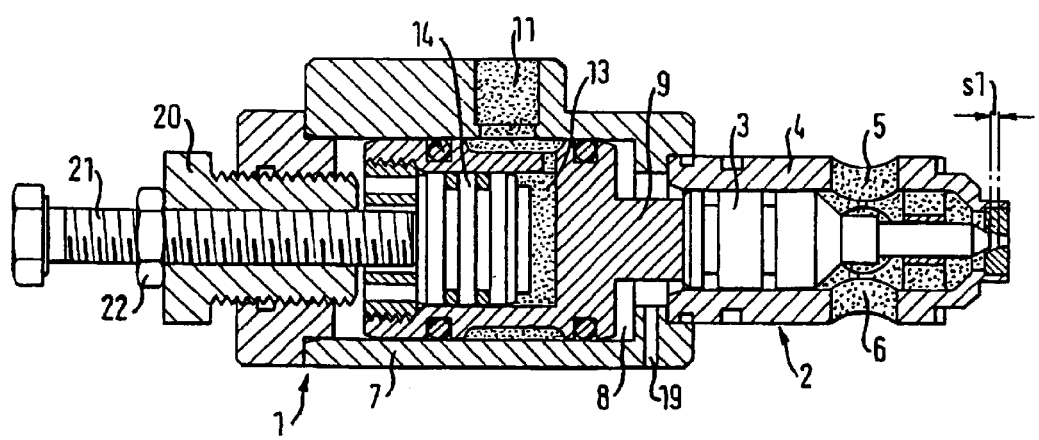
FIG. 2 a first embodiment of the injection nozzle according to the invention with the control sleeve in the forward position.

Turning now to the drawings, there is shown according to FIGS. 1 and 2 the first embodiment of the injection nozzle according to the invention showing an adjustment device 1, which is flanged to the nozzle part 2. In the exemplary embodiment as shown here, the injection nozzle 3 is disposed in an injection nozzle guide sleeve 4, which is provided with two openings 5 and 6 for the supply of each one of the compounds for the reaction molding. The adjustment device 1 comprises a housing 7, which includes several sections, wherein a control sleeve 9 is slidably moved in an essentially cylindrical interior inner chamber 8. Via a bore 10, a pressure medium 11 can be supplied, for example a hydraulic oil, into the annular gap 12 between the control sleeve 9 and the interior wall of the housing. Inside the control sleeve 9 is a pressure chamber 13 and disposed therein a slidable control piston 14 with seals 17 and 18. The pressure chamber 13 is connected with annular gap 12 so that the hydraulic oil 11 can reach the pressure chamber 13. With seals 15 and 16 disposed at the control sleeve 9, it is ensured that no hydraulic oil can emerge from the annular gap 12. In case of an unexpected leakage on the part of the adjustment device such as for example emergence of hydraulic oil in the direction of the injection nozzle or at the side of the nozzle, for example emergence of the compound in the direction of the control sleeve, a ventilation channel 19 is provided, which corresponds with the space between the control sleeve 9 and the nozzle needle 3. In the rear housing wall, a hollow cylindrical set screw 20 provided with an inner and outer thread and disposed co-axially relative to the nozzle needle is provided, forming the first stop for the control sleeve 9. Also, a further set screw 21 is provided co-axially to the nozzle needle and within the hollow cylindrical set screw 20, serving as a stop for the control piston 14 and secured with a counter nut 22.

Adjustment of the nozzle needle, respectively setting the two operational points and thus the two nozzle gaps, is carried out as follows:

For the first setting according to FIG. 1, pressure chamber 13 in the control sleeve 9 is without pressure. Through the impinging pressure of the compound, nozzle needle 3 keeps sliding together with the control sleeve 9 until the control sleeve 9 is abutting the hollow cylindrical set screw 20, thereby providing a first stop. Thus, with this setscrew 20, the first point of operation of nozzle gap, s2, can thus be adjusted.

To reach to the second point of operation (FIG. 2), pressure impinges upon the pressure chamber 13 via connection 10 by means of hydraulic oil 11. Since the control piston 14 is supported at the setscrew 21, the control sleeve 9 and thus the nozzle needle 3 is pushed forward against the pressure of the compound, until the control sleeve 9 is abutting the side of the control piston 14 facing away from the injection nozzle, representing the second stop. By means of the set screw 21 acting as a stop for control piston 14 and the control piston 14 acting as a stop for the control sleeve 9, the second stop for the control sleeve 9, the second nozzle gap, and thus s1, can be simultaneously adjusted.

The main advantage of this adjustment assembly is that the various points of operation are firmly set, that is, they can be precisely and reproducibly adjusted. Also, the impact of any disturbances are thus precluded. By means of the efficient configuration of the compound parts of the adjustment device, a very compact arrangement can be realized, which does not require more space than installations known in the prior art.

It should be understood that besides the cylindrical-symmetrical configured embodiments described here, configurations having other geometrical bases are possible in order to attain the objects of the invention described herein, for example, a adjustment assembly having a square or poly-sided diameter is possible, provided the other compound parts of the adjustment device are laid out in a suitable way and a suitable attachment of the adjustment device according to the invention is provided at the nozzle.

Instead of the moving the adjustment assembly by means of impinging pressure, the same can also be accomplished by exploiting magnetic forces, when the skilled artisan provides the adjustment device with the suitable work materials and means, with which poles can be set and changed, respectively, switched on and off in order to move the adjustment assembly to one or the other set point (point of operation) under exploitation of the magnetic forces.

While the invention has been illustrated and described as embodied in an injection nozzle for a mixing heads of reaction molding machines, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. An injection nozzle for a mixing head of reaction molding machine, comprising:

a housing;

a nozzle needle received in the housing and movable between two end positions to thereby adjust outflow of a component through art exit opening wherein the exit opening has a first opening cross section, when the nozzle assumes one of the end positions, and has a second opening cross section, when the nozzle needle assumes the other one of the end positions, wherein the first and second opening cross sections are different in size to allow to thereby allow different amounts of components to be discharged;

a control sleeve operatively connected to the nozzle needle to move the nozzle needle between the end positions and having a pressure chamber provided for admission of a pressure medium;

a control piston received in the pressure chamber and having a nozzle-needle proximal side confronting the pressure chamber and a nozzle-needle distal side;

an adjustable first stop defining one of the end positions and abutted by the control sleeve as a result of inflowing component; and an adjustable second stop for abutment of the nozzle-needle distal side of the control piston, said control sleeve moving against the nozzle-needle distal side of the control piston to define the other one of the end positions as pressure medium is admitted into the pressure chamber.

2. The injection nozzle of claim 1, wherein the first stop for the control sleeve is configured for movement in parallel relationship to the nozzle needle, said second stop for the control piston being moveably received in the first stop.

3. The injection nozzle of claim 1, wherein the second stop is implemented by a set screw, which is guided in the first stop, and a counter nut for securing the set screw.

4. The injection nozzle of claim 3, wherein the first stop for the control sleeve is implemented by a hollow cylindrical set screw having outer and inner threads.

5. The injection nozzle of claim 1, wherein the first stop for the control sleeve is disposed in coaxial relationship to the nozzle needle.

* * * * *

UNITED STATES PATENT AND TRADEMARK OFFICE
CERTIFICATE OF CORRECTION

PATENT NO. : 6,840,757 B2
DATED : January 11, 2005
INVENTOR(S) : Wolfgang Söchtig It is certified that error appears in the above-identified patent and that said Letters Patent is hereby corrected as shown below:

Column 4,
Line 62, replace "art" with -- an --; after "opening" insert -- , --.

Signed and Sealed this

Twelfth Day of April, 2005

JON W. DUDAS
*Director of the United States Patent and Trademark Office*